July 3, 1951   J. L. DRAKE ET AL   2,559,351
METHOD AND APPARATUS FOR METALIZING GLASS SHEETS
Filed Dec. 5, 1947   3 Sheets-Sheet 1

INVENTORS
John L. Drake and
John P. Pearse
BY Nobbe & Swope
ATTORNEYS

July 3, 1951 J. L. DRAKE ET AL 2,559,351
METHOD AND APPARATUS FOR METALIZING GLASS SHEETS
Filed Dec. 5, 1947 3 Sheets-Sheet 2
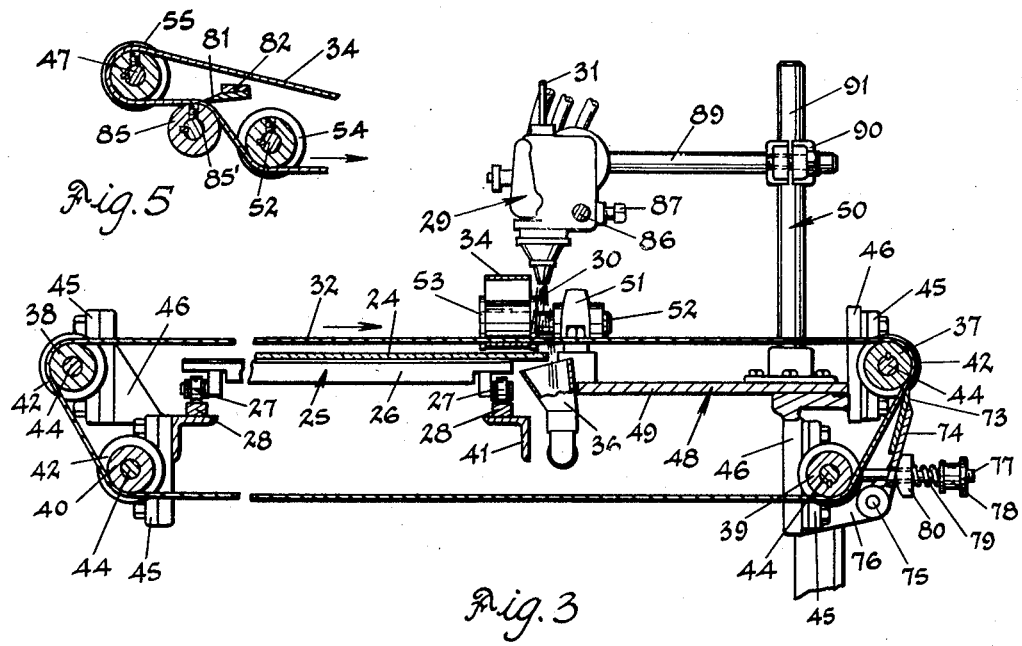
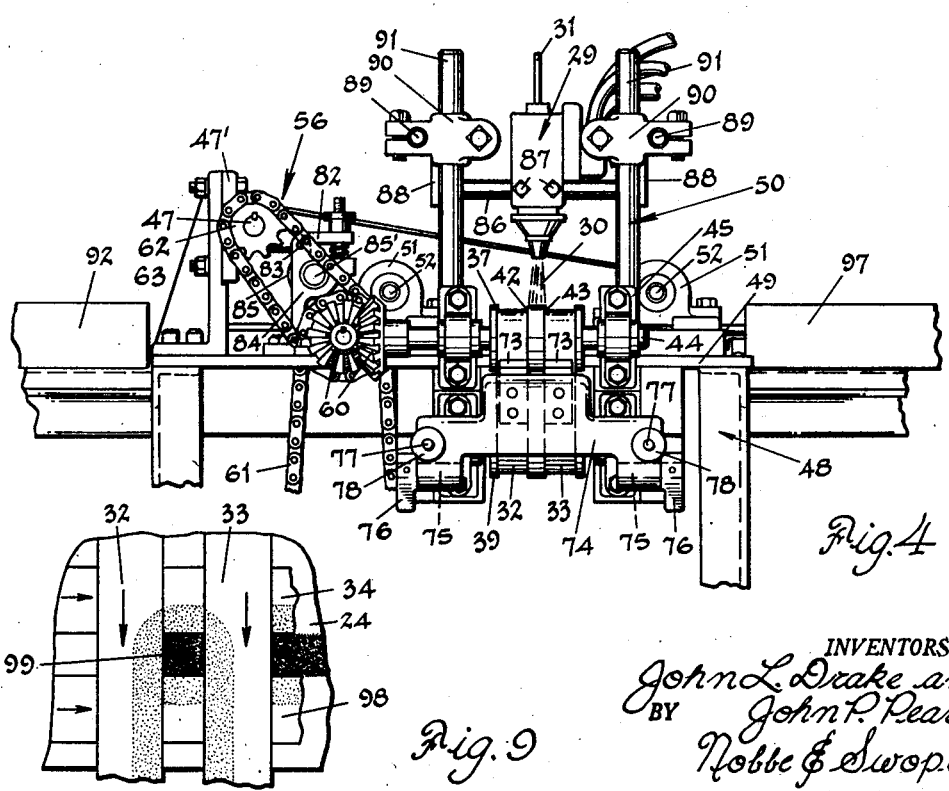
INVENTORS
John L. Drake and
BY John P. Pearse
Nobbe & Swope
ATTORNEYS INVENTORS
John L. Drake and
BY John P. Pearse
Nobbe & Swope
ATTORNEYS Patented July 3, 1951

2,559,351

UNITED STATES PATENT OFFICE 2,559,351

METHOD AND APPARATUS FOR METALIZING GLASS SHEETS

John L. Drake, Toledo, and John P. Pearse, Swanton, Ohio, assignors to Libbey-Owens-Ford Glass Company, Toledo, Ohio, a corporation of Ohio Application December 5, 1947, Serial No. 789,920

17 Claims. (Cl. 117—38)

1

The present invention relates to an improved method and apparatus for metallizing sheets or plates of glass or other materials, and deals particularly with the metallizing of glass sheets used in the manufacture of multiply glass sheet glazing units.

More especially, the invention concerns multiply glass sheet glazing units of the type comprising two or more sheets of glass spaced apart by metallic separator means which are bonded to the glass sheets around the marginal portions thereof through the intermediary of a metallic coating or coatings thereon to form an all glass-metal hermetically sealed structure.

The invention herein disclosed and claimed constitutes an improvement upon the method and apparatus disclosed in the patent to C. D. Haven, No. 2,283,253, dated May 19, 1942, for applying the metallic coating or coatings to the glass sheets preparatory to their assembly with the metallic separator means.

As described in said patent, it is preferred that the coatings on the glass sheets be produced from pure copper or an alloy of copper, as it has been found that pure copper, and some of its alloys, can be sprayed upon the glass very satisfactorily and also weather well in use. In such spraying operation, it has been customary to use a spray gun into which a wire of the desired composition is fed, melted, and sprayed in fine particles upon the glass at an angle other than a right angle with respect thereto, usually between 35 and 40 degrees. The spray gun is ordinarily of a conventional type having a typically round spray orifice.

When using such a type of spray orifice, it is known that as the molten metal leaves the nozzle of the gun, it develops a conical formation, and of this conical mass the outer portions break into a fine mist and, being unprotected from the atmosphere, cool more rapidly than the central portion or core of the spray. It has been found that this condition, coupled with the angle at which the spray is directed upon the glass, adversely affects the uniform density and thickness of the metallic coating and the adhesion of the metal to the glass.

It is the aim of this invention to provide an improved method and apparatus for applying the sprayed metallic coatings to the glass surfaces in such a manner that coatings of more uniform width and density may be obtained, with better adhesion to the glass.

Another object of the invention is the provision of an improved method and apparatus for applying the metallic coatings to the glass surfaces wherein the central hotter portion or core only of the metal spray is deposited upon the glass.

Another object of the invention is the provision of an improved method and apparatus wherein coacting elements are employed, which, by reason of their location and operation with respect to one another, permit only the impinging of the hotter metal from the core of the spray upon the glass while maintaining a protective layer or sheath of cooler metal around the core.

A further object of the invention is the provision of improved apparatus wherein the coacting elements are caused to pass in spaced relationship to one another to form a spray control area for the passage of the hotter central portion or core of the metal spray, and wherein the cooler outer portions of the spray are collected on the surfaces or edges of such elements and subsequently removed to maintain them free from accumulations of metal which would tend to reduce the effective control area and the efficiency of the application of the metallic coatings to the glass.

Other objects and advantages of the invention will become more apparent during the course of the following description, when taken in connection with the accompanying drawings.

In the drawings wherein like numerals are employed to designate like parts throughout the same:

Fig. 3 is a vertical transverse section taken substantially on the line 3—3 of Fig. 2;

Fig. 4 is an end view of the apparatus;

Fig. 5 is a detail section taken substantially on line 5—5 of Fig. 2;

Fig. 9 is a plan view of a modified arrangement;

Figure 1:
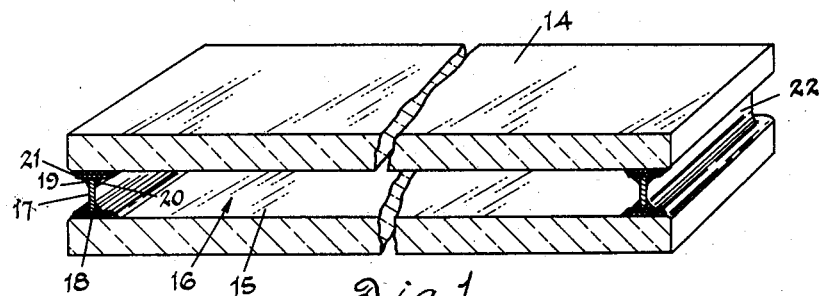
Fig. 1 is a perspective sectional view of an all glass-metal type of multiply glass sheet glazing unit in the manufacture of which the present invention may be employed.

With reference now to the drawings and particularly to Fig. 1, there is disclosed an all glass-metal glazing unit consisting generally of two sheets of glass 14 and 15 arranged in spaced, substantially parallel relation to provide an insulating air space 16 therebetween. This air space is formed by the use of metal separator strips 17 joined to the glass sheets around the marginal portions thereof through the intermediary of the metallic coatings 18 and the solder fillets 19 and 20 formed on opposite sides of separator strips 17. It is preferred that the separator strips be made from lead and that the lead strips and copper or other metallic coatings on the glass be joined together by the layers 21 of solder or other inorganic bonding material. The separator strip 17 is preferably positioned inwardly of the outer edges of the glass sheets to form a channel 22 which may be filled or coated with a suitable weatherproof seal if desired.

One form of apparatus which may be employed for applying the copper or other base coatings of metal 18 to the marginal edge portions of the glass sheets is illustrated in Figs. 2 to 8. As shown, a glass sheet 24 to be coated is placed horizontally upon and carried forwardly by a conveyor 25 which may consist of a plurality of transverse channel members 26 arranged side by side in spaced relation and carried by roller chain belts 27—27 which are moved by a suitable power drive along stationary tracks 28—28.

Disposed above the conveyor 25 is a metallizing spray gun 29 which may be of any construction capable of producing a spray of metal 30 that can be directed upon the preselected edge portions of the glass sheet moving thereunder. It has been found that very satisfactory results can be obtained when using a spray gun into which a wire 31 of the desired metal is fed, melted and sprayed in fine particles upon the glass.

The deposit of metal upon the glass is not only controlled by the relative position of the metallizing gun with respect to the glass, speed of wire through the gun, and speed of movement of the glass, but also by a plurality of surfaces provided by a plurality of moving endless imperforate bands or belts 32, 33 and 34, the belts 32 and 33 extending in spaced parallel relation transversely of the path of travel of the glass sheet while belt 34 extends in the direction of travel of the glass.

Figure 7:
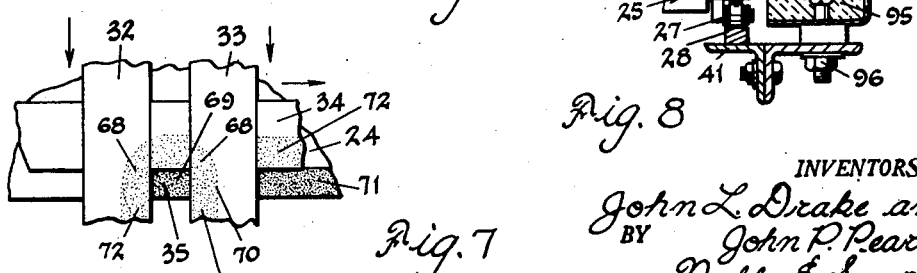

These belts are preferably formed from chrome plated steel, or like metal which has a low affinity with the sprayed metal. The belts are arranged to create an open area or aperture 35 directly above the marginal edge portion of the glass sheet as shown in Fig. 7 and through which only those desired portions of the metal spray 30 will be permitted to pass as will be more fully hereinafter described. The adjacent edges of the belts 32 and 33 are located in substantially parallel relation to form two sides of the passageway 35 while the belt 34 is arranged to provide a third side. The position of the belt 34 determines the width of the metallic coating applied to the glass sheet while that portion of the metal spray which is directed beyond the edge of the glass may be collected in a suitable receptacle 36 to prevent undesirable accumulations of metal on the apparatus.

The belts 32 and 33 are trained about four pulleys 37, 38, 39 and 40, the pulleys 37 and 38 being in horizontal alignment and arranged so that the upper flights of the belts are slightly elevated above the glass sheet while the lower flights of the belts are trained about the pulleys 39 and 40 which are located beneath the conveyor supporting frame 41. The four pulleys are similarly provided with grooves 42 and 43 for receiving the belts and are mounted on shafts 44 journaled in bearings 45 attached to brackets 46 which are preferably secured to the conveyor frame 41 in any suitable manner to permit vertical adjustment of the bearings to vary the elevation of the pulleys and belts.

As shown in Fig. 3, the brackets 46 of pulleys 38 and 40 are located on one side of the conveyor frame 41 while the brackets for pulleys 37 and 39 are connected to an auxiliary frame 48 at the opposite side of the frame 41. The frame 48 has a horizontal platform 49 which carries the supporting framework 50 for the spray gun 29; also the journal bearings 51 for the shafts 52 of pulleys 53 and 54 and bearing 47' of shaft 47 of pulley 55 about which pulleys 53, 54 and 55 the belt 34 is trained so as to extend in the direction of movement of the glass. The lower flight of the belt, between the pulleys 53 and 54, runs beneath the upper flights of the belts 32 and 33 and is located in close relation to the under surfaces thereof as shown in Fig. 3. The width of the metallic coating 19 on the glass is determined by the distance of the belt 34 from the edge of the glass sheets 24.

The pulleys 53, 54 and 55 are driven from a gear train generally indicated at 56 which comprises a journaled horizontal shaft 57, drive sprockets 58 and 59 keyed thereto, and a pair of meshing beveled gears 60, one being keyed to shaft 57 and the other to the shaft 44 of pulley 37. The sprocket 58 is driven from a suitable source of power (not shown) through a sprocket chain 61 and transmits such power to the bevel gears 60 to operate the belts 32 and 33. The gear 59 is also driven by sprocket 58 and is connected to a sprocket 62 through a sprocket chain 63, said sprocket 62 being keyed to the shaft 47 of pulley 55 which drives the belt 34.

Figures 2, 6, 8:
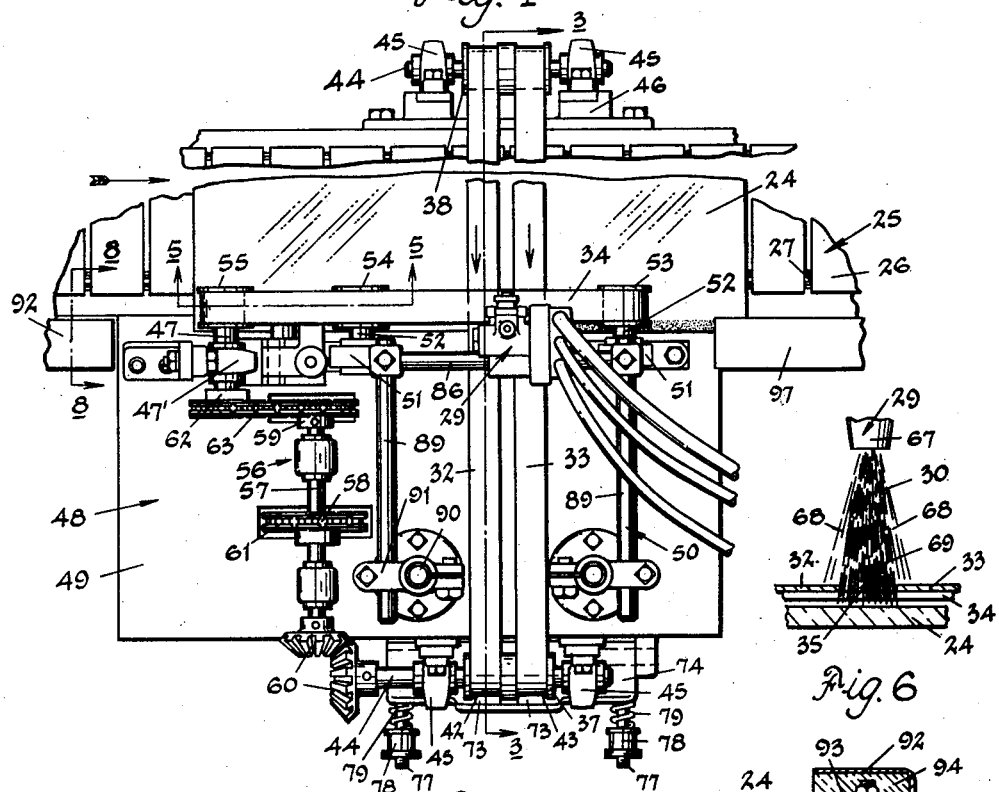
Fig. 2 is a plan view of one form of apparatus which may be used in carrying out the invention.
Figs. 6 and 7 are views illustrating the manner in which the spraying of the molten metal upon the glass is controlled.
Fig. 8 is a detail section taken substantially on line 8—8 of Fig. 2.

Referring to Figs. 6 and 7 of the drawings, wherein the metal spray 30 is illustrated as it is projected from the nozzle 67 of the gun 29, it will be seen that the outer portions 68 of the substantially conical spray are collected on the surfaces of the belts 32, 33 and 34, while the inner, hotter portion or core 69 only of the spray is permitted to pass through the aperture 35 formed by the belts and impinge on the surface of the glass sheet 24 as said sheet is carried forwardly on the conveyor 25. In Fig. 7 the spray pattern is generally indicated at 70 and the metallic coating on the glass at 71. The undesired portions of the spray which are collected on the belts, as indicated at 72, are carried away from the operating area by the said belts.

The metal deposits which are collected on the belts may be removed by spring-pressed knife blades having sharpened edge portions contacting the surface of the belts to peel or otherwise scrape the metal from the belt surfaces. Thus, the belts 32 and 33 are engaged by knife blades 73 secured to a mounting plate 74 which is pivotally carried on horizontal stub shafts 75 secured to the arms 76 extended from the frame 48. In order to suitably vary the pressure exerted by the knife blades 73 on the belts 32 and 33, there is carried by frame 48 a pair of threaded rods 77 which extend through the mounting plate 74 and have hand knobs 78 threaded upon the ends thereof. By manipulation of the knobs 78 along rods 77, the plate 74 will urge the knife blades against the surfaces of the belts according to the compression of springs 79 positioned between the knobs 78 and blocks 80. While the springs serve to resiliently force the blades 73 into an operative position, they also allow for rising of the blades to prevent damage to the belts.

A similar knife blade 81 is positioned with respect to the belt 34 (Fig. 5) so as to remove the metal deposits 72 from its surface and thereby provide a means of maintaining a clean surface free of metal. The knife blade 81 is carried by a bar 82 which is supported by a pin 83 on a bracket 84. This bracket is mounted on the platform 49 and also affords a journal for the shaft 85' of an idler roll 85 over which the belt is trained into position for engagement by the knife blade 81. As shown in Fig. 5, the idler roll 85 is so located with reference to the pulleys 54 and 55 to provide a rising portion in the belt 34 in the vicinity of the knife blade 81 which removes the metal accumulation as the belt moves from the pulley 55 to the idler 85 and thence to the pulley 54 which again locates the lower flight of the belt in position to function with the belts 32 and 33 in forming the aperture 35.

Having first determined the desired width of the metallic coating 71 to be applied to the glass sheet by positioning of the belts 32, 33 and 34 with respect to each other and to the proximate edge of the sheet, the spray gun 29 is shifted either longitudinally or transversely to produce a spray of metal 30 of the usual conical formation substantially centrally of the aperture 35. To obtain a simplicity of movement and/or adjustment, the gun 29 is carried by the framework 50 which includes a horizontal rod 86 on which the gun is supported and secured by set screws 87. The ends of the rod 86 are received in clamping blocks 88 which in turn are carried by horizontally disposed rods 89, said rods 89 being supported in clamping blocks 90 that are slidably mounted on vertical standards 91.

In positioning the gun, the blocks 90 are shifted along the standards 91 until the desired height of the nozzle 67 above the surface of the glass is obtained. Then, by moving the gun, either along the rod 86, or by movement of the clamping blocks 88 along rods 89, the spray may be brought into a centralized position with respect to the aperture 35 formed by the belts.

Before the molten metal is sprayed on the glass, the marginal edge portions of the glass sheet are first preferably heated to prevent thermal shock of the glass itself and also to facilitate a proper bonding of the metal to the glass. The exact temperature of the glass will vary somewhat with the size and thickness of the sheet, but in all cases care should be exercised to avoid warpage of the glass and heating should be confined to that area below the critical annealing point of the glass. For ordinary plate and window glass, it has been found that a temperature of between 500 and 600 degrees F. is satisfactory. Heating of the glass sheet in this way prior to spraying of the metal thereon results in an excellent bond between the glass and metal.

To this end, as the glass sheet 24 is carried along upon the conveyor 25 and before it reaches the metallizing spray gun 29, the marginal edge portion of the sheet, which projects beyond the conveyor, passes through an electrical heating device 92 (Fig. 8). This heating device may comprise an electrical element 93 arranged between upper and lower insulated cover plates 94 and 95 carried by supports 96. As illustrated, no part of the heating device actually touches the glass surface to be coated. The arrangement of the heater and length of heating zone are dependent upon the speed of the machine and exact operating temperatures desired. It is preferred that the heating be accomplished as rapidly as possible and confined to a narrow strip at the edge of the glass. This serves to confine the compressional strain to a narrow band and helps to prevent warpage and breaking of the glass. The heater is so controlled that when the glass reaches a position under the gun 29, it is within the predetermined temperature range desired.

In practice, the glass sheet 24 is laid horizontally upon the conveyor 25 so that the marginal edge portion thereof to be coated projects forwardly beyond the edge of the conveyor as clearly shown in Fig. 3. It is carried in this manner progressively through the heating device 92 to a position beneath the belts 32, 33 and 34 and spray gun 29. After the glass sheet has been metallized, the metal coated edge portion thereof is preferably passed through one or more heating devices 97. These heaters are desirable because their use permits a gradual lowering of the glass temperature to that of the surrounding atmosphere. This is in effect an annealing of the metallized glass edge portion.

As the marginal edge portion of the sheet 24 passes beneath the aperture 35, it is subjected to the action of the spray of molten metal 30 from spray gun 29. However, as brought out above, only the hotter central portion or core of the metal spray is permitted to pass through the aperture 35 and impinge on the glass while the cooler outer portions of the spray surrounding the core are collected upon the belts 32, 33 and 34. Thus, the outer portion of the spray forms a protective body around the core until it reaches the aperture 35. In this way, the metal which is deposited upon the glass will be of a substantially uniform temperature and will result in a metallic coating of substantially uniform width, density and thickness as well as improved metal to glass bond.

As the coated portions of the belts 32, 33 and 34 move from the metallizing area, their surfaces are engaged by the knife blades 73 and 81 to remove the deposits of metal that have accumulated thereon. As previously pointed out, the belts are preferably of a chrome plate steel composition, and, by reason of this fact, the metal spray collects on rather than bonds to the belt surface. Removal of the reject portions of the spray can therefore be easily accomplished and the returning portions of the belts maintained in a clean condition to prevent building up along the edges or on the adjacent surfaces of the belts.

By repetitive trips of the sheet through the apparatus, a metallic coating 18 can be applied along all four marginal edge portions of one or both surfaces of the glass. Upon completion of such a series of operations, the glass sheet can be processed with other sheets to complete its assembly into a unit such as that shown in Fig. 1. Of course, a unit composed of three or more glass sheets with two or more air spaces can be provided.

The improved method and apparatus above described may also be employed for applying strips of metal to sheets or plates of glass or other materials inwardly of opposite edges thereof, as shown in Fig. 9, simply by the provision of an additional belt 98 extending parallel with belt 34 and cooperating therewith and with belts 32 and 33 to form an aperture 99 enclosed on all four sides.

Figure 10:
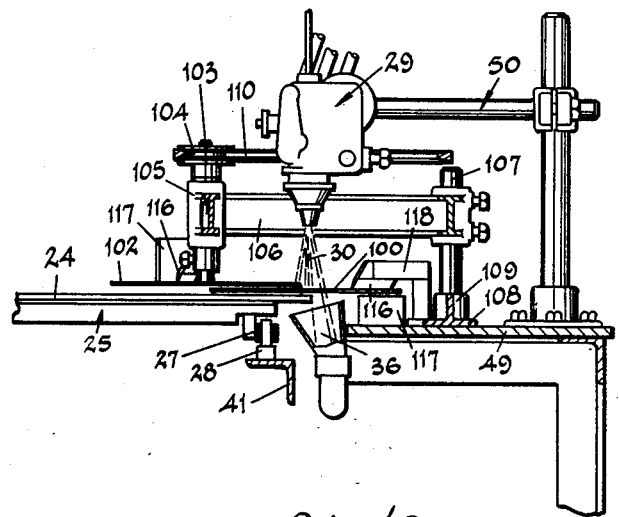
Fig. 10 is a vertical sectional view of a further modified form of apparatus.
Figure 11:
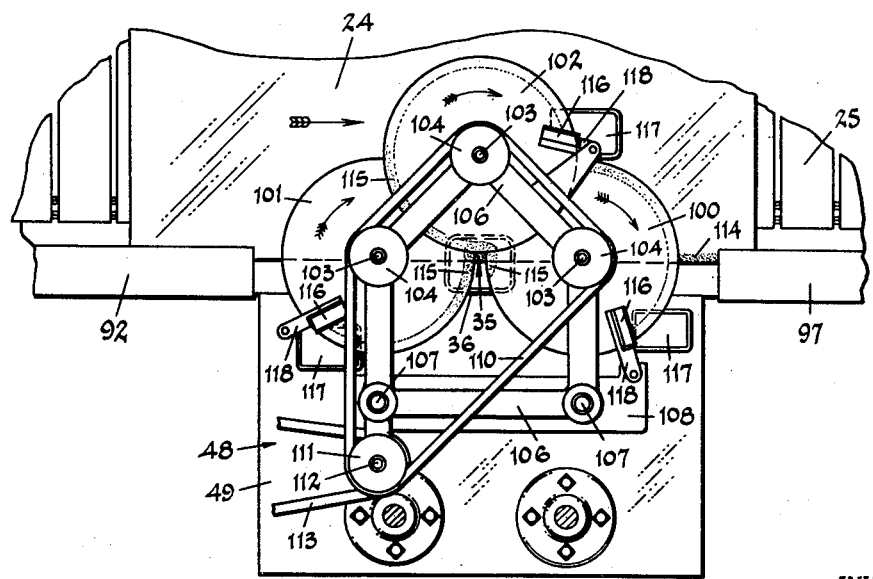
Fig. 11 is a plan view thereof.

The embodiments of the invention, illustrated in Figs. 2 to 8 inclusive, may be modified as illustrated in Figs. 10 and 11 without departing from the practice of the improved method or the spirit of the invention. The construction shown in Figs. 10 and 11 also provides an aperture 35 through which the hotter central portion or core of the metal spray 30 is directed upon the glass while the outer cooler portions of the spray are gathered on three revolving disks 100, 101 and 102 in substantially the same manner as the belts previously described. The disks 100 and 101 are arranged side by side while disk 102 is arranged above and between disks 100 and 101 and inwardly of the edge of the glass sheet 24 so that it provides a metering edge whereby the desired width of metal coating will be produced.

The disks are carried on the lower ends of vertically disposed shafts 103 having pulleys 104 keyed to their upper ends. The central portion of each shaft is journaled in the bearing portion 105 of a bracket or frame 106 which is mounted on columns 107. The columns may be secured in a plate 108 having bosses 109 for receiving said columns.

The disks are driven by a belt 110 which is trained about the pulleys 104 and a drive pulley 111 having a shaft 112 also journaled in the frame 106. Transmission of power may be supplied to the shaft 112 by a belt 113 that may be driven in any suitable manner.

The spray gun 29 is mounted, as previously set forth, and adjusted in its position so that the nozzle thereof will be in perpendicular alignment with the aperture 35 formed by the disks. The metal spray of the gun is accordingly divided so that the hottest central portion only will pass through the aperture while the outer cooler portions of the spray will be gathered on the disks. The metallic coating on the glass is indicated by the numeral 114 in Fig. 11 while the accumulation of metal on the disks is indicated by the areas 115. The areas of metal 115 are removed during each revolution of the disks to prevent any building up of the metal which might reduce the size of the aperture or affect the operation of the disks with relation to each other. Scrapers, or knife blades 116, are positioned to engage the upper surfaces of the disks and their sharpened edges serve to gather the metal and direct it away from the disks into suitable containers 117. The knife blades 116 are carried by supporting bars 118 which locate the blades with respect to the disks so that a positive downward pressure will be produced to scrape the disk surfaces clean while also urging the thus scraped metal outwardly from the disks and into the containers for subsequent removal. The disks will thus present a continually well defined edge and surface to form the aperture 35 through which only the desired central portion of the metal spray will be permitted to pass and coat the surface of the glass.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. The method of metallizing sheets or plates of glass or other materials, comprising directing a spray of molten metal upon the sheet in a direction substantially perpendicular with respect to the sheet surface to be coated, and causing only the central portion or core of the spray to impinge upon the sheet.

2. The method of metallizing sheets or plates of glass or other materials, comprising directing a spray of molten metal upon the sheet in a direction substantially perpendicular with respect to the sheet surface to be coated, and protecting the sheet from contact by the outer portion of the spray while permitting the central portion or core only thereof to impinge upon the sheet.

3. The method of metallizing sheets or plates of glass or other materials, comprising directing a spray of molten metal of substantially conical formation against the sheet at a direction substantially perpendicular with respect to the sheet sruface to be coated, separating the outer portion of the spray from the central portion or core thereof, and causing said central portion or core only of the metal spray to impinge upon the sheet.

4. The method of metallizing sheets or plates of glass or other materials, comprising directing a spray of molten metal upon the sheet in a direction substantially perpendicular with respect to the sheet surface to be coated, collecting the outer portion of the spray at a point in relatively close proximity to the sheet upon surfaces moving continuously relative to the spray of molten metal, and causing the central portion or core only of the spray to pass between said moving surfaces and be deposited upon the sheet.

5. The method of metallizing sheets or plates of glass or other materials, comprising directing a spray of molten metal of substantially conical formation through an aperture defined by continuously moving surfaces and at a direction substantially perpendicular with respect to the sheet surface to be coated, regulating the size of the aperture to cause only the central portion or core of the metal spray to pass therethrough and be deposited upon the sheet, collecting the outer portion of the metal spray upon said continuously moving surfaces, and carrying the metal spray collected upon the said continuously moving surfaces away from the metallizing area.

6. The method of metallizing sheets or plates of glass or other materials, comprising directing a spray of molten metal through an aperture defined by continuously moving surfaces and at a direction substantially perpendicular with respect to the sheet surface to be coated, regulating the size of the aperture to cause only the central portion or core of the metal spray to pass therethrough and be deposited upon the sheet, collecting the outer portion of the metal spray upon said continuously moving surfaces which carry it from the metallizing area, and cleaning the metal from the coated portions of said surfaces before such surface portions are returned to the metallizing area.

7. The method of metallizing the marginal edge portions of glass sheets, which comprises directing a spray of molten metal upon the glass sheet at a direction substantially perpendicular to the marginal edge portion thereof to be coated, dividing the spray formation into a central portion and a surrounding outer portion, and causing the central portion only of the spray to be deposited upon the glass.

8. The method of metallizing the marginal edge portions of glass sheets, which comprises directing a spray of molten metal of substantially conical formation upon the glass sheet at a direction substantially perpendicular to the marginal edge portion thereof to be coated, dividing the spray formation at a point in relatively close proximity to the sheet into inner and outer portions, causing the inner portion of the spray to be deposited upon the glass sheet, and collecting the outer portion upon continuously moving surfaces which carry it away from the metallizing area.

9. The method of metallizing the marginal edge portions of glass sheets, which comprises directing a spray of molten metal of substantially conical formation upon the glass sheet at a direction substantially perpendicular to the marginal edge portion thereof to be coated, dividing the spray formation at a point in relatively close proximity to the sheet into inner and outer portions, causing the inner portion of the spray to pass through an aperture defined by continuously moving surfaces and be deposited upon the glass sheet, collecting the outer portion of the spray upon said continuously moving surfaces which carry it from the metallizing area, and cleaning the metal from the coated portions of said surfaces before such surface portions are returned to the metallizing area.

10. The method of metallizing the marginal edge portions of glass sheets, which comprises directing a spray of molten metal of substantially conical formation upon the glass sheet at a direction substantially perpendicular to the marginal edge portion thereof to be coated, dividing the spray formation at a point in relatively close proximity to the sheet into inner and outer portions, causing the inner portion of the spray to pass through an aperture defined by continuously moving surfaces and be deposited upon the glass sheet, collecting the outer portion of the spray upon said continuously moving surfaces which carry it from the metallizing area, and effecting relative movement between the glass sheet and metal spray during the metallizing operation.

11. In an apparatus for metallizing sheets or plates of glass or other material, means for supporting the sheet, metallizing means mounted to direct a metal spray upon the sheet in a direction substantially perpendicular with respect to the sheet surface to be coated, means for effecting relative movement between the sheet and metal spray during the metallizing operation, and continuously moving means moving independently of the metallizing means disposed in the path of the outer portion of the metal spray for separating said outer portion from the central portion or core of the spray which is deposited upon the sheet.

12. In an apparatus for metallizing sheets or plates of glass or other material, means for supporting the sheet, metallizing means mounted to direct a metal spray upon the sheet in a direction substantially perpendicular with respect to the sheet surface to be coated, means for effecting relative movement between the sheet and metal spray during the metallizing operation, continuously moving means located in the path of the spray and defining an aperture relatively smaller than said spray so that the central portion or core only of the spray is caused to pass through the aperture and be deposited upon the sheet while the outer portion of the spray is collected upon said continuously moving means and means for moving said continuously moving means independently of and relative to the metallizing means to carry the spray collected thereupon from the metallizing area.

13. In an apparatus for metallizing sheets or plates of glass or other material, means for supporting the sheet, metallizing means mounted to direct a metal spray upon the sheet in a direction substantially perpendicular with respect to the sheet surface to be coated, means for effecting relative movement between the sheet and metal spray during the metallizing operation, continuously moving means located in the path of the spray and defining an aperture relatively smaller than said spray so that the central portion or core only of the spray is caused to pass through the aperture and be deposited upon the sheet while the outer portion of the spray is collected upon said continuously moving means and carried thereby from the metallizing area, and means for removing the metal deposits from said continuously moving means.

14. In an apparatus for metallizing sheets or plates of glass or other material, means for supporting the sheet, metallizing means mounted to direct a metal spray upon the sheet in a direction substantially perpendicular with respect to the sheet surface to be coated, means for effecting relative movement between the sheet and metal spray during the metallizing operation, continuously moving means located in the path of the spray and defining an aperture relatively smaller than said spray so that the central portion or core only of the spray is caused to pass through the aperture and be deposited upon the sheet while the outer portion of the spray is collected upon said continuously moving means, means for moving said continuously moving means independently of and relative to the metallizing means to carry the spray collected thereupon from the metallizing area, means for removing the metal deposits from said continuously moving means, means for adjusting said continuously moving means to vary the size of the aperture and thereby control the width of the metal coating on the sheet, and means for varying the position of the metallizing means in relation to the aperture.

15. In an apparatus for metallizing the marginal edge portions of glass sheets, means for supporting the sheet in a substantially horizontal position, metallizing means mounted above the sheet supporting means for directing a metal spray of substantially conical formation downwardly and substantially perpendicular with respect to the glass sheet, means for causing relative movement between the sheet and metallizing means, a pair of endless traveling belts arranged in spaced parallel relation transversely of the path of travel of the glass sheet, and a third endless traveling belt extending in the direction of travel of the sheet inwardly of the edge thereof and cooperating with the first belts to define an aperture in line with said spray, said aperture being relatively smaller than said spray so that the central portion or core only of the spray is caused to pass through the aperture and be deposited upon the glass sheet while the outer portion of the spray is collected upon said belts and carried thereby from the metallizing area.

16. In an apparatus for metallizing the marginal edge portions of glass sheets, means for supporting the sheet in a substantially horizontal position, metallizing means mounted above the sheet supporting means for directing a metal spray of substantially conical formation downwardly and substantially perpendicular with respect to the glass sheet, means for causing relative movement between the sheet and metallizing means, a pair of endless traveling belts arranged in spaced parallel relation transversely of the path of travel of the glass sheet, and a third endless traveling belt extending in the direction of travel of the sheet inwardly of the edge thereof and cooperating with the first belts to define an aperture in line with said spray, said aperture being relatively smaller than said spray so that the central portion or core only of the spray is caused to pass through the aperture and be deposited upon the glass sheet while the outer portion of the spray is collected upon said belts and carried thereby from the metallizing area, means for removing the metal from the belts, said third belt being horizontally adjustable to vary the size of the aperture and control the width of the metallic coating on the glass sheet, and means for adjusting the metallizing means in relation to said aperture.

17. In an apparatus for metallizing the marginal edge portions of glass sheets, means for supporting the sheet in a substantially horizontal position, metallizing means mounted above the sheet supporting means for directing a metal spray of substantially conical formation downwardly and substantially perpendicular with respect to the glass sheet, means for causing relative movement between the sheet and metallizing means, a plurality of horizontally disposed continuously revolving disks cooperating with one another to define an aperture in line with said spray, said aperture being relatively smaller than said spray so that the central portion or core only of the spray will pass through the aperture and be deposited upon the glass sheet while the outer portion of the spray is collected on the disks, and means for removing the metal from said disks.

JOHN L. DRAKE.
JOHN P. PEARSE.

REFERENCES CITED

The following references are of record in the file of this patent:

UNITED STATES PATENTS

| Number | Name | Date |
|---|---|---|
| 1,221,695 | Dann | Apr. 3, 1917 |
| 1,256,599 | Schoop | Feb. 19, 1918 |
| 2,334,624 | Haven et al. | Nov. 16, 1943 |
| 2,432,659 | Criswell | Dec. 16, 1947 |

FOREIGN PATENTS

| Number | Country | Date |
|---|---|---|
| 530,198 | Germany | July 23, 1931 |